UNITED STATES PATENT OFFICE.

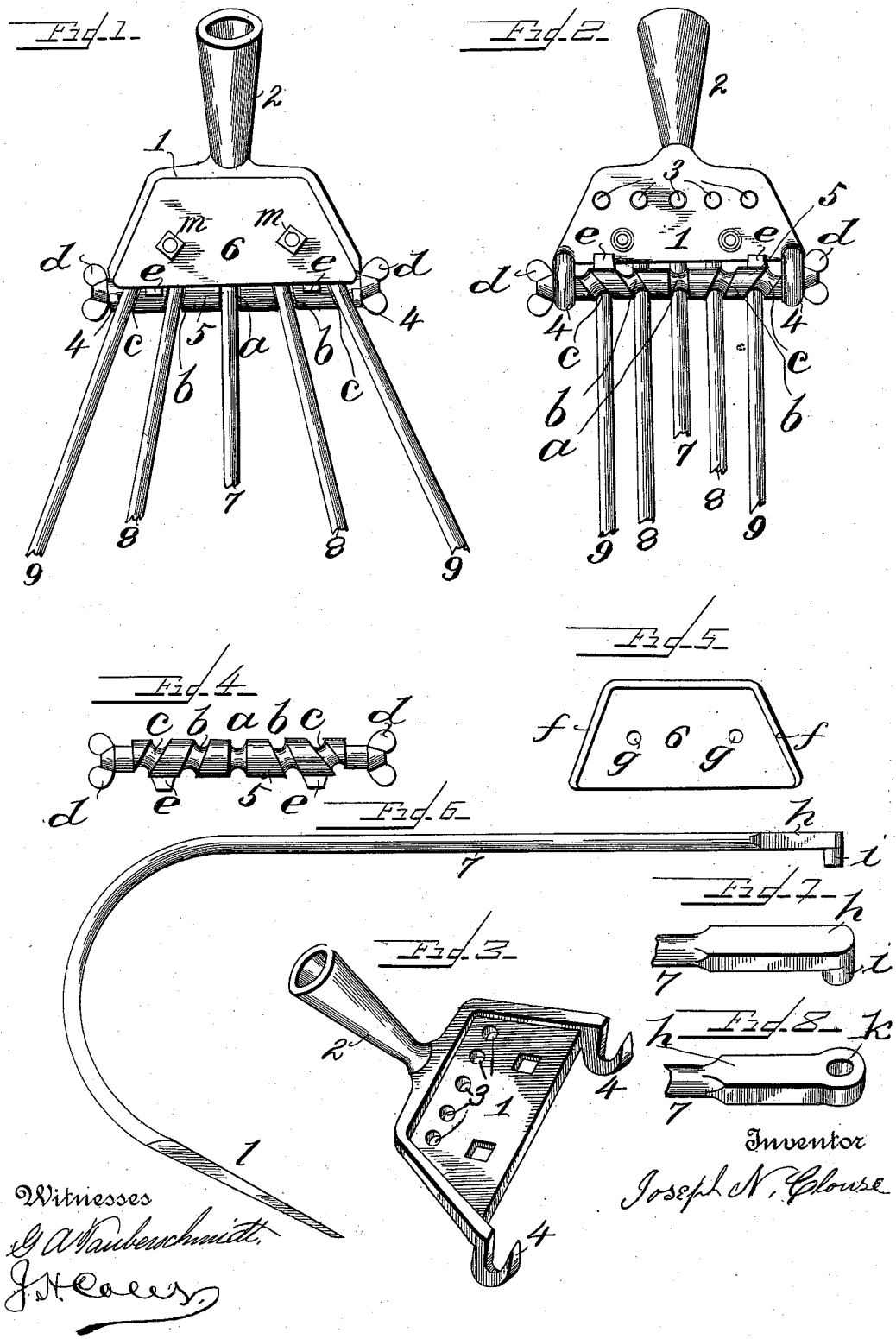

JOSEPH N. CLOUSE, OF ST. LOUIS, MISSOURI, ASSIGNOR OF ONE-FOURTH TO M. V. WALL, OF TOLEDO, OHIO.

ADJUSTABLE HEAD FOR CULTIVATORS.

SPECIFICATION forming part of Letters Patent No. 534,199, dated February 12, 1895.

Application filed March 18, 1893. Serial No. 466,725. (No model.)

*To all whom it may concern:*

Be it known that I, JOSEPH N. CLOUSE, a citizen of the United States, residing at St. Louis, in the State of Missouri, have invented new and useful Improvements in Adjustable Heads for Cultivators, of which the following is a specification.

My invention relates to improvements in cultivator heads to which the various kinds of shovels, blades or tines are secured, and the object of my improvements is to provide a substantial fastening and a rapid and perfect adjustment for the attachment of these various shovels, blades, or tines, to the head of the cultivator either for horse or hand use. I attain these objects by the mechanism illustrated in the accompanying drawings, in which—

Figure 1, is a top view of the head complete with the socket, and a portion of the tines or shovels extending from the head the same being shown in their most extended form. Fig. 2, is a bottom view of the head complete with the socket and a portion of the tines or shovels extending from it, the same being shown in their most contracted form. Fig. 3, is a perspective view of the upper side of the head plate with the socket and the hanger hooks for the adjustment roller. Fig. 4, is a view of the adjustment roller. Fig. 5, is an under side view of the binding or cap plate. Fig. 6, is a view of one of the tines or shovels complete. Fig. 7, is an enlarged detail view of the head of one of the tines or shovels. Fig. 8, is an enlarged detail view of the head of one of the tines or shovels which shows a modified form reversing the order by putting the hole in the tine or shovel and the pin or projection on the head plate.

In all of the views like letters and numerals refer to like parts.

The body plate 1, of the head is flat and plain on the under side and braced with a border rib around three sides of its top. From its longer front edge projects out on each corner a hanger 4, 4, and from its back edge projects at a desired angle a socket 2, for a handle. This plate is provided also with two or more bolt holes and a series of pins or holes 3 to receive and secure the ends of the tines or shovels 7, 8, 9.

In the hangers 4, 4, is pivoted an adjustment roller 5. This adjustment roller is provided with thumb screw extensions $d, d$, on each end outside of its bearings, small projecting stops $e, e$, and a series of grooves around it which form seatings for the several tines or shovels 7, 8, 8, and 9, 9. The center groove $a$, extends directly around the roller 5. The grooves $b, b$, on either side of the center take a right and left spiral screw or worm like direction, and the outer grooves $c, c$, on either side take a still greater right and left pitch in their spiral screw or worm like direction. The object of the grooves is to perfectly and quickly adjust the several tines or shovels to an extended or contracted position as shown respectively in Figs. 1 and 2. The tine or shovel Fig. 6, is curved over, hooking, and flattened and sharpened at the point, $l$, and at the head $h$, it is squared, and provided with a pin (or a hole) by means of which it is pivoted to the plate 1. There are four or more of these tines or shovels and when they are all in position a cap binding plate 6, having a flange $f, f$, and bolt holes $g, g$, is placed over them and the two bolts put through the two plates and tightened so as to bind the two plates firmly together with the heads of the tines or shovels between them. Then by simply slacking the strain of the bolts the adjustment roller 5, may be rotated forward or backward until the stops $e, e$, strike the plate 1, below or the plate 6, above. As it is rotated these tines lying across it and in their respective grooves are carried in or out respectively as desired, and also retained at any point by simply tightening the binding bolts. As to the particular shape and construction of these tines or shovels, Fig. 6, I design to use the head $h$, in either the pin or hole-form, Fig. 7, or Fig. 8; but that portion outside of the cultivator head, as 7, to $l$, I design to bend and shape as a tine, or to attach to it a shovel as the work or use to which it is to be adapted demands. Its various parts will be made of steel and iron, and adapted in its uses and purposes to be made for a hand or horse cultivator.

I am aware that cultivators have been made prior to my invention, with the tines or shovels in some way adjustable in the head. I therefore do not claim such a construction broadly; but

Having thus fully described my invention, what I do claim as my invention, and desire to secure by Letters Patent, is—

1. In an adjustable head for cultivators, the body plate with its handle-socket, series of pivot holes and hangers, in combination with an adjusting roller, provided with bearings and a series of straight and spiral right and left grooves, substantially as described.

2. In an adjustable head for cultivators, the body plate with its handle-socket, hangers, and series of pivot holes, in combination with the heads of the tines provided with pivot pins substantially as described.

3. In an adjustable head for cultivators, the combination of a series of tines secured by pivots and bolts between a binding plate and a body plate provided with a handle socket, and hangers, to which is pivoted an adjustment roller provided with a series of grooves, substantially as specified.

4. In an adjustable head for cultivators, the combination of the body plate with its socket, series of pivot holes, hangers, adjustment roller, with its series of grooves, the series of tines with their heads and pivot pins secured by means of a binding plate, and bolts, all substantially as set forth.

In testimony whereof I have hereunto set my hand in the presence of two subscribing witnesses.

JOSEPH N. CLOUSE.

Witnesses:
P. F. BURBRIDGE,
GARRARD STRODE.